(12) United States Patent
Ko et al.

(10) Patent No.: US 9,591,568 B2
(45) Date of Patent: Mar. 7, 2017

(54) METHOD FOR RECEIVING SIGNAL AT USER EQUIPMENT IN A MULTI-TIER WIRELESS COMMUNICATION SYSTEM

(71) Applicant: LG ELECTRONICS INC., Seoul (KR)

(72) Inventors: Hyunsoo Ko, Anyang-si (KR); Hyeyoung Choi, Anyang-si (KR); Jaehoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 128 days.

(21) Appl. No.: 14/369,944

(22) PCT Filed: Jan. 18, 2013

(86) PCT No.: PCT/KR2013/000392
§ 371 (c)(1),
(2) Date: Jun. 30, 2014

(87) PCT Pub. No.: WO2013/109077
PCT Pub. Date: Jul. 25, 2013

(65) Prior Publication Data
US 2015/0003310 A1   Jan. 1, 2015

Related U.S. Application Data

(60) Provisional application No. 61/589,235, filed on Jan. 20, 2012.

(51) Int. Cl.
*H04W 48/16* (2009.01)
*H04W 52/02* (2009.01)
*H04W 76/04* (2009.01)

(52) U.S. Cl.
CPC ... *H04W 52/0212* (2013.01); *H04W 52/0225* (2013.01); *H04W 52/0274* (2013.01); *H04W 48/16* (2013.01); *H04W 76/046* (2013.01)

(58) Field of Classification Search
None
See application file for complete search history.

(56) References Cited

U.S. PATENT DOCUMENTS

| | | | |
|---|---|---|---|
| 2011/0002284 A1* | 1/2011 | Talwar | H04L 12/66 370/329 |
| 2012/0008510 A1* | 1/2012 | Cai | H04B 7/0404 370/252 |
| 2016/0050712 A1* | 2/2016 | Kim | H04W 52/028 370/311 |

FOREIGN PATENT DOCUMENTS

| | | | | |
|---|---|---|---|---|
| EP | 2357735 A2 | 8/2011 | | |
| KR | 10-2011-0130456 A | 12/2011 | | |
| KR | 20110130456 A | * 12/2011 | | H04B 7/0684 |

* cited by examiner

*Primary Examiner* — Sulaiman Nooristany
(74) *Attorney, Agent, or Firm* — Dentons US LLP

(57) ABSTRACT

A method for receiving a signal at a User Equipment (UE) in a multi-tier wireless communication system is disclosed. The method includes receiving antenna turn-on/turn-off interval information about a transmission point. The antenna turn-on/turn-off interval information is used for connection transition of a UE related to the transmission point.

12 Claims, 11 Drawing Sheets

MeNB : macro eNodeB
PeNB : pico eNodeB
FeNB : femto eNodeB

MUE : macro UE
PUE : pico UE
FUE : femto UE

METHOD FOR RECEIVING SIGNAL AT USER EQUIPMENT IN A MULTI-TIER WIRELESS COMMUNICATION SYSTEM

This application is a 35 USC §371 National Stage entry of International Application No. PCT/KR2013/000392, filed Jan. 18, 2013, and claims priority to U.S. Provisional Application No. 61/589,235 filed Jan. 20, 2012, each of which are hereby incorporated by reference in its entirety.

TECHNICAL FIELD

The present invention relates to a multi-tier wireless communication system, and more particularly, to turn-on/turn-off of an antenna in a transmission point.

BACKGROUND ART

Wireless communication systems have been widely deployed in order to provide various types of communication services including voice or data. In general, a wireless communication system is a multiple access system that can support communication with multiple users by sharing available system resources (a bandwidth, transmission power, etc.). Examples of multiple access systems include Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi Carrier Frequency Division Multiple Access (MC-FDMA), etc.

DISCLOSURE OF INVENTION

Technical Problem

An object of the present invention devised to solve the conventional problem is to provide an operation for turning on/off an antenna of a transmission point and operations of the transmission point and a User Equipment (UE), when the antenna of the transmission point is turned on/off in a multi-tier wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Solution to Problem

In an aspect of the present invention, a method for receiving a signal at a User Equipment (UE) in a multi-tier wireless communication system includes receiving antenna turn-on/turn-off interval information about a transmission point. The antenna turn-on/turn-off interval information is used for connection transition of a UE related to the transmission point.

In another aspect of the present invention, a UE in a multi-tier wireless communication system includes a reception module and a processor.

The processor is configured to receive antenna turn-on/turn-off interval information about a transmission point, and the antenna turn-on/turn-off interval information is used for connection transition of a UE related to the transmission point.

The above aspects of the present invention may include all or a part of the followings.

If the UE is in Radio Resource Control (RRC)_CONNECTED state, the UE may receive a cell search command.

The cell search command may include information about cell candidates on which the UE is to perform cell search.

Even though the UE is connected to another transmission point by the cell search, a UE Identifier (ID) allocated to the UE by the transmission point may be maintained.

The UE may reconnect to the transmission point, when an antenna turn-off time interval ends.

The antenna turn-on/turn-off interval information may be an indicator indicating that the UE is to transmit or receive a signal to or from the transmission point a predetermined time later.

The antenna turn-on/turn-off interval information may be an indicator indicating that the UE is to attempt entry into the transmission point a predetermined time later.

If the UE is in IDLE state, the UE may attempt to receive a control signal after an antenna turn-off time interval ends.

The UE may receive the antenna turn-on/turn-off interval information on a broadcast channel.

The UE may receive the antenna turn-on/turn-off interval information in system information.

The antenna turn-on/turn-off interval information may indicate an integer multiple of a unit time being one of a radio frame and a subframe.

The transmission point may be one of a micro base station, a femto base station, a pico base station, and a relay base station.

Advantageous Effects of Invention

According to the present invention, when an evolved Node B (eNB) does not transmit a signal, interference with neighbor cells or users using the same frequency can be reduced.

Further, as a cell requiring small capacity does not use power of a specific eNB or antenna, energy can be saved.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
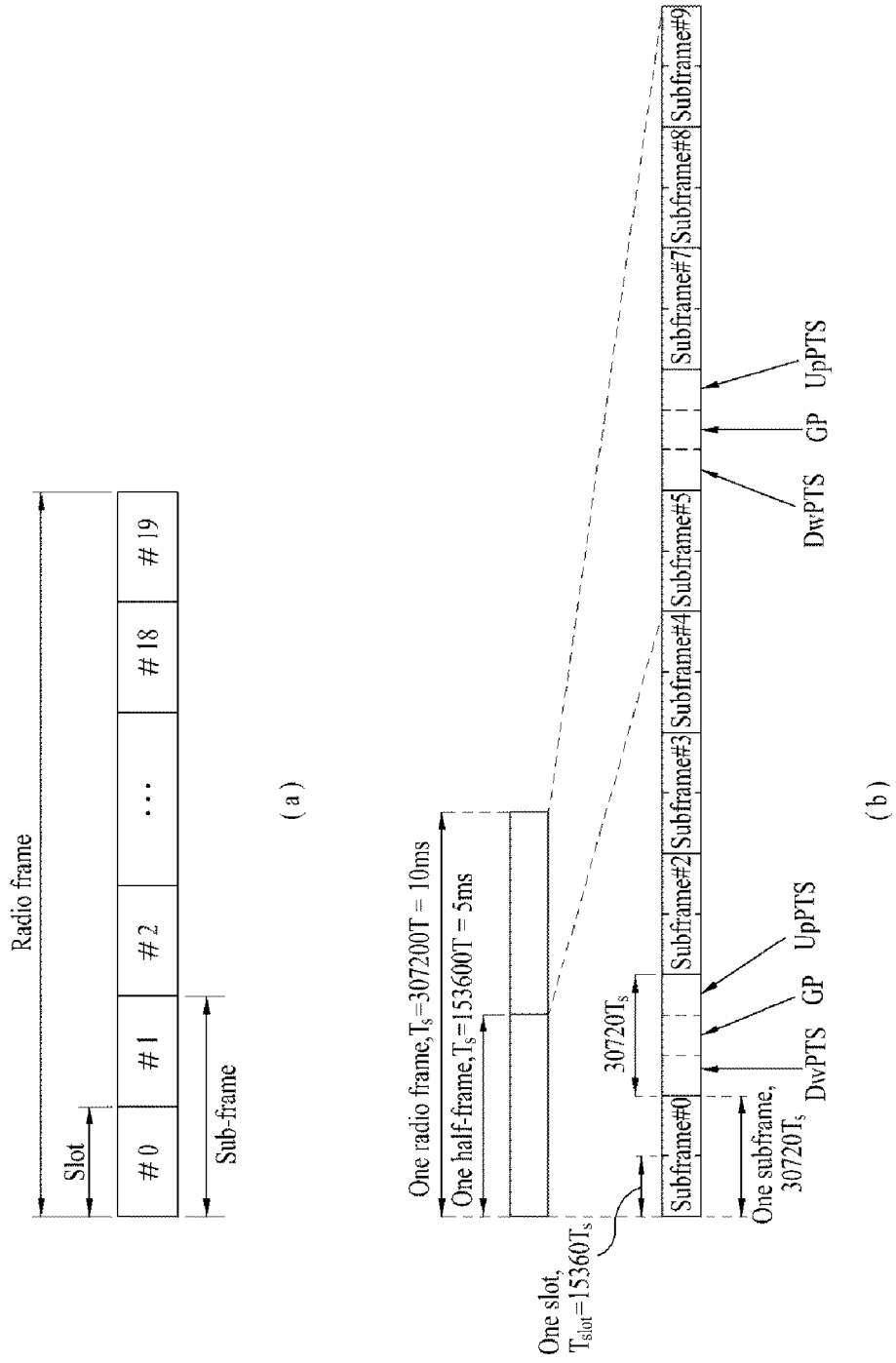
FIG. 1 illustrates the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA.

3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(*a*) illustrates the type-1 radio frame structure. A downlink radio frame is divided into 10 subframes. Each subframe is further divided into two slots in the time domain.

A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control Channel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE.

The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
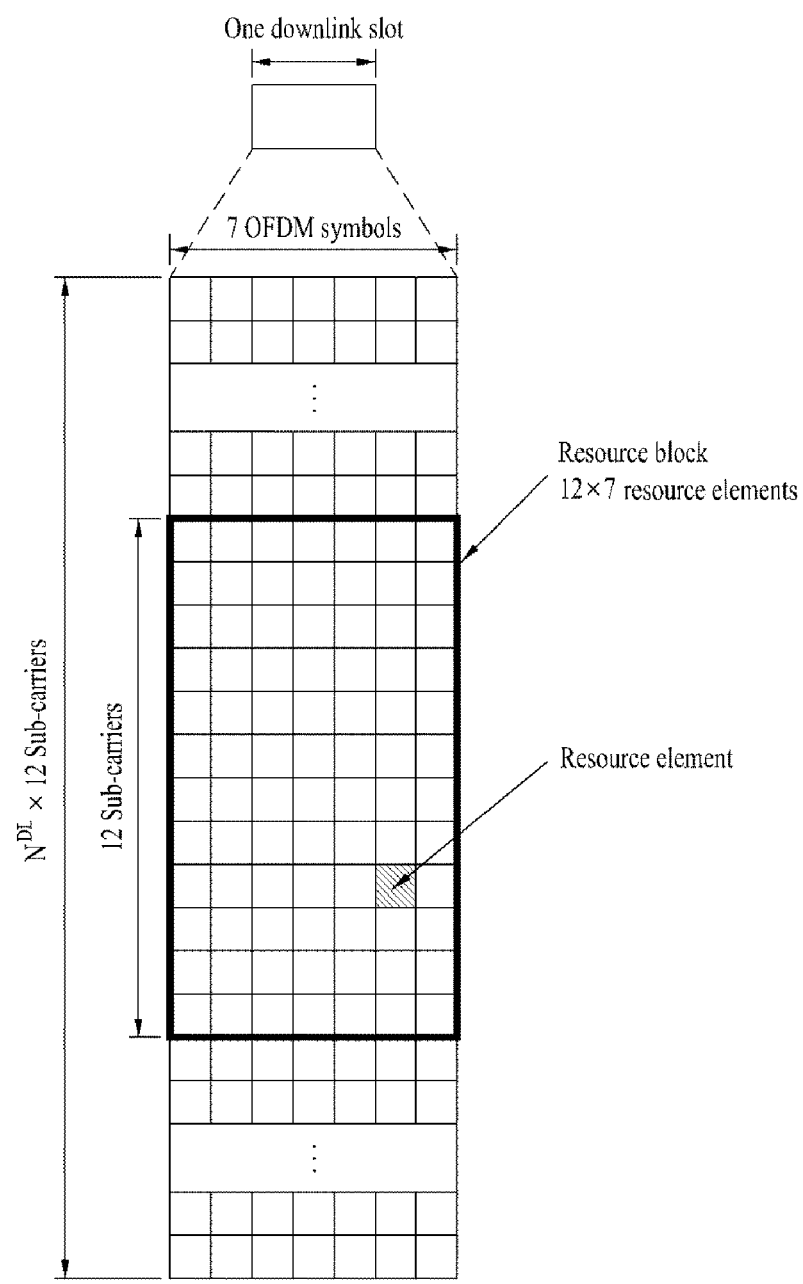
FIG. 2 illustrates the structure of a downlink resource grid for the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
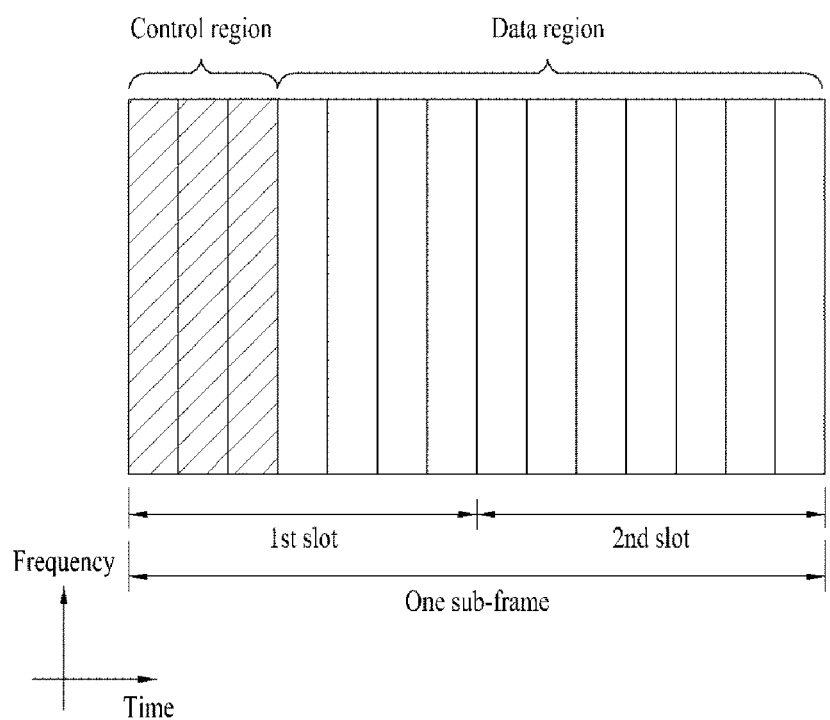
FIG. 3 illustrates the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator Channel (PCFICH), a Physical Downlink Control Channel (PDCCH), and a Physical Hybrid automatic repeat request (HARQ) Indicator Channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
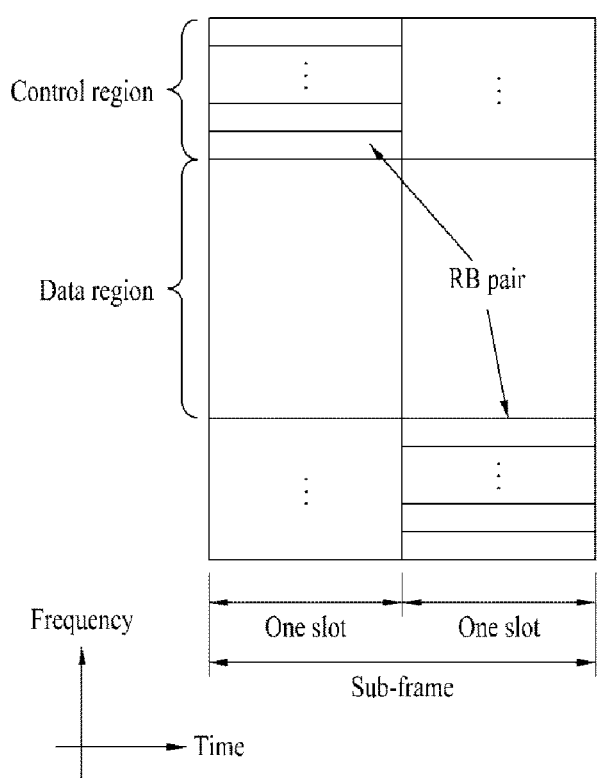
FIG. 4 illustrates the structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe.

The RBs of the RB pair occupy different subcarriers in two slots. Thus it is said that the RB pair allocated to the PUCCH is frequency-hopped over a slot boundary.

Heterogeneous Network Deployment

Figure 5:
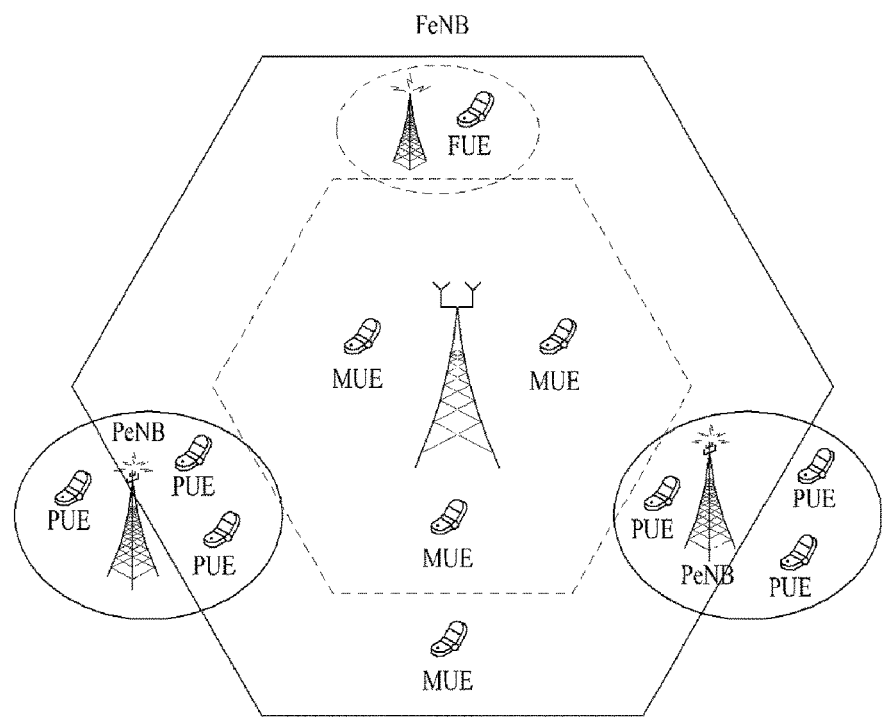
FIG. 5 is a view referred to for describing a heterogeneous network.

FIG. 5 illustrates a heterogeneous-network wireless communication system including a macro eNB (MeNB) and a micro eNB, that is, a Pico eNB (PeNB) or a Femto eNB (FeNB). Herein, the term 'heterogeneous network' refers to a network in which a MeNB coexists with a PeNB or FeNB, in spite of the same Radio Access Technology (RAT).

A MeNB is a general eNB having broad coverage and high transmission power in a wireless communication system. The MeNB may also be called a macrocell.

A PeNB or FeNB may also be called a microcell, a picocell, a femtocell, a Home eNB (HeNB), a relay, etc., for example. These exemplary PeNB or FeNB and MeNB may be collectively referred to as transmission points. A PeNB or FeNB is a small-size version of a MeNB, which can operate independently, performing most of the functions of the MeNB. The PeNB or FeNB is overlaid in the coverage area of the MeNB or installed in a shadowing area beyond coverage of the MeNB. Compared to the MeNB, the PeNB or FeNB may accommodate a small number of UEs with small coverage and low transmission power.

A UE may be serviced directly by a MeNB (a Macro UE (MUE)) or by a PeNB or FeNB (a Pico UE (PUE) or Femto UE (FUE)). In any case, a PUE existing in the coverage of the PeNB may be serviced by the MeNB.

PeNBs or FeNBs may be classified into two types depending on whether they restrict access from a UE.

One type is an eNB of an Open access Subscriber Group (OSG) or non-Closed access Subscriber Group (non-CSG). The eNB allows access from a legacy MUE or a PUE or FUE of a PeNB or FeNB. The MUE may perform handover to an OSG eNB.

The other type is a CSG eNB. The CSG eNB does not allow access from a legacy MUE or a PUE or FUE of a PeNB or FeNB. Thus, a UE cannot perform handover to a CSG eNB.

Handover

A handover procedure and a random access procedure in the LTE system will be described below in detail.

Figure 6:
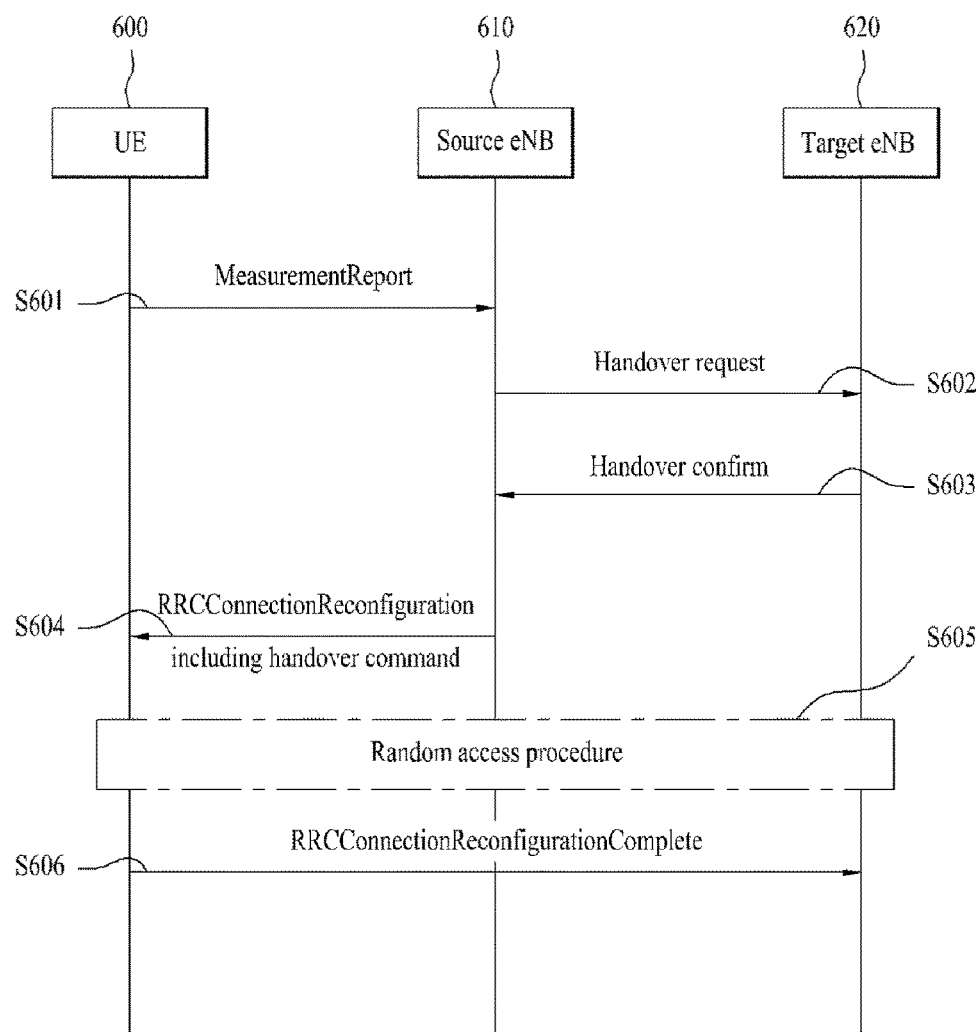
FIG. 6 is a diagram illustrating a signal flow for a handover procedure.

FIG. 6 is a diagram illustrating a signal flow for a handover procedure. Referring to FIG. 6, upon generation of a handover trigger, while monitoring measurements on a serving eNB 610 currently connected to a UE 600 and neighbor cells, the UE 600 transmits a measurement report to the serving eNB 610 (S601). The measurement report may include measurements represented as Reference Signal Received Powers (RSRPs), Received Signal Strength Indicators (RSSIs), Reference Signal Received Qualities (RSRQs), etc.

RSRP is defined as the linear average over the power contributions of REs that carry downlink CRSs. RSSI is defined as the linear average of the total received power of a UE, including interference and noise power from neighbor cells. RSRQ is defined as (NxRSRP/RSSI), where N is the number of RBs over the measurement bandwidth of RSSI.

Transmission of a measurement report may be determined by the following conditions for event-based measurement report decision:

i) when the measurement of a serving cell becomes larger than an absolute threshold;

ii) when the measurement of the serving cell becomes smaller than the absolute threshold;

iii) when the measurement of a neighbor cell becomes larger than the measurement of the serving cell by an offset;

iv) when the measurement of the neighbor cell becomes larger than the absolute threshold; and v) when the measurement of the serving cell becomes smaller than the absolute threshold and the measurement of the neighbor cell becomes larger than another absolute threshold.

Herein, the measurements may be the afore-described RSRP values.

Alternatively, it may be regulated that a measurement report is transmitted only when each of the above-described conditions for measurement report decision is kept satisfied for a predetermined time or longer.

Figure 7:
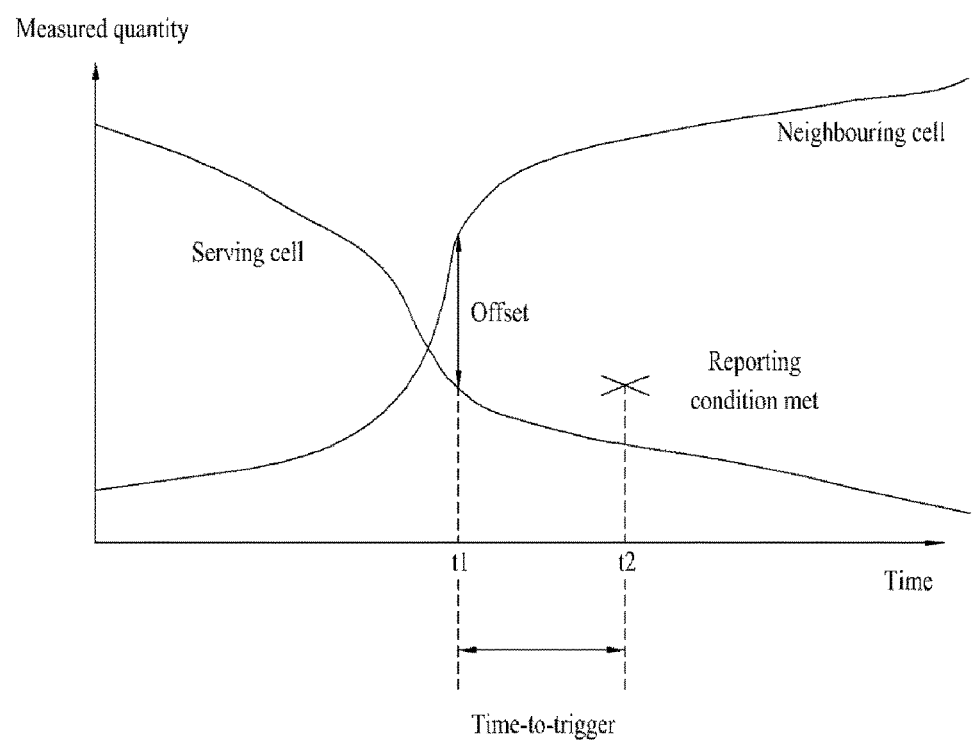
FIG. 7 is a graph referred to for describing an operation for determining whether to transmit a measurement report in the handover procedure.

Among the measurement report decision conditions, condition iii) will be described in greater detail with reference to FIG. 7. The UE continuously measures the RSRPs of the serving cell and a neighbor cell. If the UE is approaching the neighbor cell, the RSRP of the neighbor cell gets larger than that of the serving cell by an offset at time t1, and then a predetermined time (i.e. a time to trigger) elapses from time t1 to time t2, the UE may transmit a measurement report. The offset and the time to trigger may be set by the network.

Upon receipt of the measurement report from the UE 600, the serving eNB 610 transmits a Handover Request message to a target eNB 620 (S601). The serving eNB 610 also provides the target eNB 620 with Radio Resource Control (RRC) context information about the UE 600.

The target eNB 620 determines whether to perform handover of the UE 600 based on the RRC context information. When determining to perform handover of the UE 600, the target eNB 620 generates a Handover Command and transmits a Handover Confirm message to the serving eNB 610 (S603). The serving eNB 610 transmits an RRCConnectionReconfiguration message including the Handover Command to the UE 600 (S604). The RRCConnectionReconfiguration message may include radio resource configuration information, a security configuration, and a Cell-Radio Network Temporary Identifier (C-RNTI), which are common to UEs within the coverage area of the target eNB 620.

Upon receipt of the RRCConnectionReconfiguration message, the UE 600 initiates a random access procedure to the target eNB 620 (S605). When the random access procedure is successfully completed, the UE 600 ends the handover procedure by transmitting an RRCConnectionReconfigurationComplete message to the target eNB 620 (S606).

The afore-described random access procedure during handover will be detailed below. In the LTE system, a UE may perform the random access procedure in the following cases:

when the UE initially accesses an eNB without an RRC connection established with the eNB;

when the UE initially accesses a target cell during handover;

when the eNB requests handover by a command;

when uplink data is generated in a situation where uplink timing is not synchronized or radio resources for requesting radio resources are not allocated; and in a recovery procedure triggered by radio link failure or handover failure.

Now, a general contention-based random access procedure will be described below based on the above description.

Figure 8:
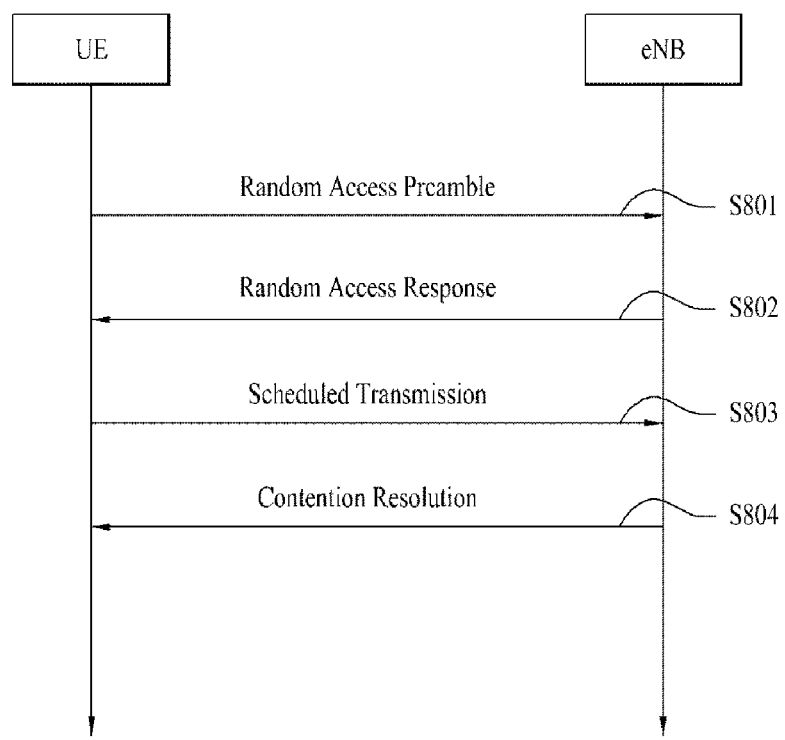
FIG. 8 is a diagram illustrating a signal flow for a random access procedure.

FIG. 8 is a diagram illustrating a signal flow for a contention-based random access procedure between a UE and an eNB.

(1) Transmission of First Message

The UE may select a random access preamble randomly from a random access preamble set indicated by system information or a Handover Command, select Physical Radom Access Channel (PRACH) resources, and transmit the selected random access preamble in the selected PRACH resources (S801).

(2) Reception of Second Message

After transmitting the random access preamble, the UE attempts to receive its random access response within a random access response reception window indicated in the system information or the Handover Command by the eNB (S802). More specifically, the random access response may take the form of a Medium Access Control Packet Data Unit (MAC PDU) and the MAC PDU may be transmitted on a PDSCH. To receive information on the PDSCH successfully, the UE preferably monitors a PDCCH. That is, the PDCCH preferably carries information about a UE to receive the PDSCH, time and frequency information about radio resources of the PDSCH, and the transport format of the PDSCH. Once the UE succeeds in receiving the PDCCH directed to it, the UE may receive a random access response on the PDSCH based on information of the PDCCH. The random access response may include a Random Access Preamble Identifier (RAPID), an Uplink (UL) Grant indicating uplink radio resources, a temporary C-RNTI, and a Time Advance Command (TAC).

The reason for including the RAPID in the random access response is to indicate a UE to which the UL Grant, the temporary C-RNTI, and the TAC are valid because one random access response may include random access preamble information for one or more UEs. It is assumed in this step that the UE selects an RAPID corresponding to the random access preamble selected in step S802. Thus the UE is capable of receiving the UL grant, the temporary C-RNTI, and the TAC in the random access preamble response.

(3) Transmission of Third Message

Upon receipt of the random access response valid to the UE, the UE processes the information included in the random access preamble separately. That is, the UE applies the TAC and stores the temporary C-RNTI. In addition, the UE may store data to be transmitted in response to reception of the valid random access response in a third buffer.

The UE transmits data (i.e. a third message) to the eNB based on the UL Grant (S803). The third message should include an ID of the UE. In the contention-based random access procedure, although the eNB cannot identify UEs that perform the random access procedure, the eNB needs to identify the UEs for later contention resolution.

Inclusion of the ID of the UE in the data is considered in two methods. In one method, if the UE has a valid cell ID that has been allocated by the cell before the random access procedure, the UE transmits the cell ID in an uplink signal based on the UL Grant. On the other hand, if the UE does not have a valid cell ID allocated before the random access procedure, the UE transmits its unique ID (e.g. System Architecture Evolution-Temporary Mobile Subscriber Identity (S-TMSI) or Random Id). After transmitting the data based on the UL Grant, the UE starts a Contention Resolution (CR) timer.

(4) Reception of Fourth Message

After transmitting the data including its ID based on the UL Grant included in the random access response, the UE awaits reception of a command for contention resolution from the eNB. That is, the UE attempts PDCCH reception in order to receive a specific message (S804). The UE may receive a PDCCH in two methods. As described before, if a third message including a cell ID has been transmitted in response to the UL Grant, the UE attempts to receive a PDCCH using the cell ID. If a third message including the unique ID of the UE has been transmitted in response to the UL Grant, the UE attempts to receive a PDCCH using the temporary C-RNTI included in the random access response. In the former case, upon receipt of a PDCCH using the cell ID before expiration of the CR timer, the UE ends the random access procedure, considering that the random access procedure is completed successfully. In the latter case, upon receipt of a PDCCH using the temporary C-RNTI before expiration of the CR timer, the UE checks data delivered on a PDSCH indicated by the PDCCH. If the data includes the unique ID, the UE ends the random access procedure, considering that the random access procedure is completed successfully.

Compared to the contention-based random access procedure illustrated in FIG. 8, a non-contention-based random access procedure is characterized in that the random access procedure ends simply by transmission of the first and second messages. Notably, before transmitting a random access preamble as the first message to the eNB, the UE gets the random access preamble allocated by the eNB. Thus the UE transmits the allocated random access preamble as the first message to the eNB and receives a random access response from the eNB, thereby ending the random access procedure.

Multi-Tier Network Environment

Figure 9:
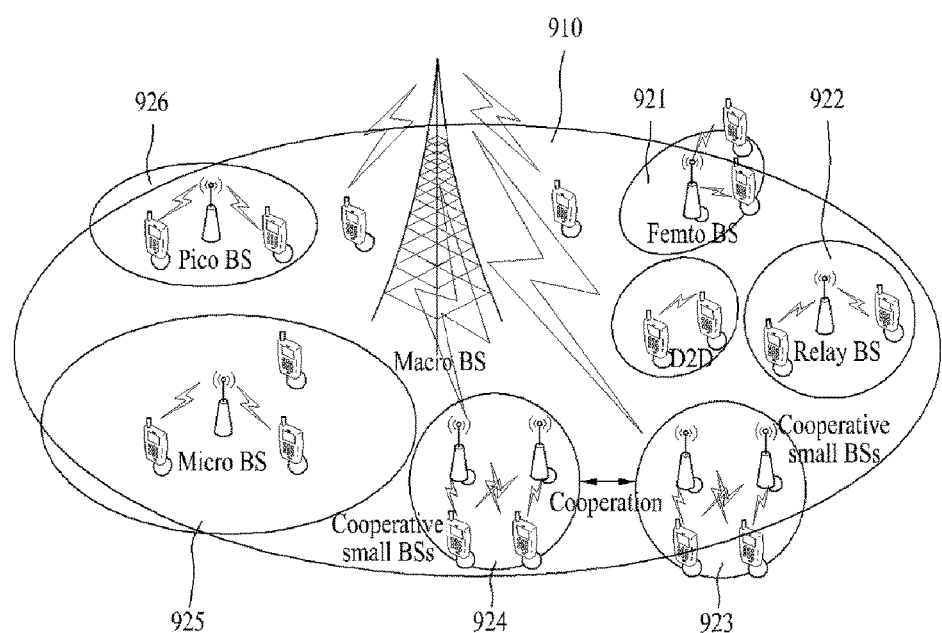
FIG. 9 illustrates a multi-tier network to which an embodiment of the present invention is applicable.

FIG. 9 illustrates the configuration of a multi-tier network that has recently been introduced in order to increase cell capacity in mobile communication. The multi-tier network may achieve a cell-splitting gain by deploying a plurality of small cells 921 to 926 having small coverage in a large cell 910 having large coverage. Small-cell transmission points may include a femto BS, a relay BS, one of Device to Device (D2D) UEs, a cooperative small BS, a micro BS, a pico BS, etc., as illustrated in FIG. 9.

In the multi-tier network, interference between a small cell and a large cell may restrict communication performance.

Another consideration for the multi-tier network is that a communication capacity required for a specific area may change over time. When there are a large number of communication users as in a hot spot, communication capacity may be increased by introducing a small cell. However, if the communication capacity requirement is small, sufficient capacity may be provided just with a large cell. In this case, the BS/transmission point of the small cell may experience unnecessary power consumption.

To overcome the above problem, the present invention provides a method for turning off an antenna of a BS in the multi-tier network environment. The antenna turning-off method advantageously reduces interference with neighbor cells or users using the same frequency due to non-signal transmission of a BS and allows a cell requiring small capacity to save energy due to non-use of power in a specific BS or antenna. However, since communication with a BS having its antenna powered off is impossible, there exists a need for defining an operation of a UE around the BS during an antenna turn-on/turn-off interval and defining a control signal for the operation of the UE. In this context, operations of a BS (hereinafter, referred to as a transmission point) and a UE to support reliable turn-off of an antenna of the transmission point will be described below.

In operation, the transmission point may provide information about an antenna turn-on/turn-off interval to UEs related to the transmission point (including a UE to report measurements and/or to perform handover to the transmission point, a UE belonging to the transmission point, etc.). If the transmission point does not transmit power to a UE placed in RRC_CONNECTED state, the UE needs to transition to another state (e.g. to connect to another neighbor transmission point) until before the transmission point is powered on. If the UE may have knowledge of a time at which the transmission point will start to transmit power, the UE may attempt entry into the transmission point or exchange information required to maintain a connection.

The antenna turn-on/turn-off interval information may include information indicating a turn-on interval and/or a turn-off interval. For example, if the minimum unit of a turn-on/off time interval is a radio frame as described later, the turn-on/off interval information may take the form of a bitmap representing radio frames corresponding to the turn-off time interval as 1 s. The antenna turn-on/turn-off interval information may be configured in different manners. For example, the antenna turn-on/turn-off interval information may be an indicator indicating a specific time after which information is to be exchanged, when information has been exchanged in RRC_CONNECTED state. In another example, the antenna turn-on/turn-off interval information may be an indicator indicating a specific time after which entry is to be attempted in RRC_CONNECTED state.

A channel carrying the antenna turn-on/turn-off interval information may be broadcast so that all users of the transmission point may receive the channel. For example, the transmission point may transmit information about an active/inactive time interval on a Broadcast Channel (BCH) carrying basic information about a cell. In another example, the transmission point may transmit the information about the active/inactive time interval in a System Information Block (SIB) carrying system information.

The minimum unit of an active/inactive time interval of a transmission point may be a radio frame or superframe. For example, if a radio frame is a basic unit and an inactive time interval spans 'N' radio frames, 'N' may be indicated by an indicator.

Now a description will be given of an operation of a UE. The UE may receive antenna turn-on/turn-off interval information in RRC_CONNECTED state or IDLE state, which will be described separately.

Figure 10:
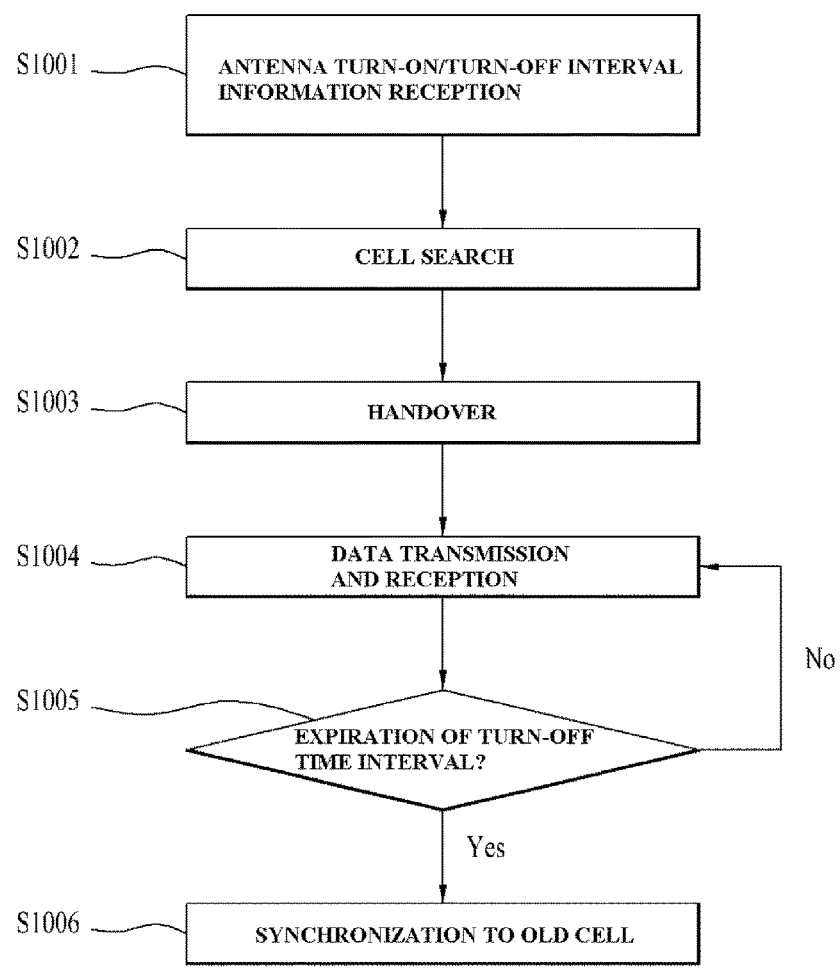
FIG. 10 is a flowchart illustrating an operation of a User Equipment (UE), when the UE receives information about an antenna turn-on/turn-off interval in Radio Resource Control (RRC)_CONNECTED state.

FIG. 10 is a flowchart illustrating an operation of a UE, when the UE receives information about an antenna turn-on/turn-off interval in RRC_CONNECTED state.

Referring to FIG. 10, the UE receives antenna turn-on/turn-off interval information from a transmission point (S1001). The transmission point may correspond to a large cell or a small cell in a multi-tier network environment. The UE may perform cell search (S1002). Specifically, the RRC_CONNECTED-state UE may attempt to connect to another air interface in order to maintain a connection to the network. For this purpose, the transmission point commands a connection setup to the UE and thus the UE attempts entry by searching for a neighbor cell. A candidate set of cells for cell search may be additionally indicated. That is, the transmission point may indicate a candidate set for cell search, taking into account antenna turn-on/turn-off interval information about other small cells. The candidate set may be included in the antenna turn-on/turn-off interval information in step S1001 or in the afore-mentioned connection setup command of the transmission point and transmitted to the UE. When the candidate set for cell search is indicated to the UE in this manner, the UE may perform cell search based on the candidate set to search for a cell.

Upon detection of a neighbor cell, the UE attempts to communicate with the neighbor cell via an air interface. For example, the UE may perform handover to the detected neighbor cell (S1003).

The UE may transmit data to or receive data from the air interface (e.g. to or from the neighbor cell connected through handover) (S1004). Step S1003 and/or S1004 may be performed using a UE ID allocated to the UE by the old transmission point.

The UE determines whether the turn-off time interval has ended (or the turn-off time interval is about to end) (S1005). Upon termination of the turn-off time interval, that is, upon start of the turn-on time interval, the UE attempts synchronization to and/or measurement on the old cell/transmission point and attempts data transmission and reception by detecting a control channel transmitted with the UE ID allocated to the UE.

In the case where the UE receives the antenna turn-on/turn-off interval information from the transmission point in IDLE state, the UE attempts to receive a control signal after the antenna turn-on time interval. A time to receive a control signal is defined for IDLE-state UEs. When the antenna of the transmission point is turned on, the time to receive a control signal may be redefined with respect to an antenna turn-on time.

Or the transmission point may reset the time to receive a control signal and restricts measurement of the UE to the time, so that the UE can be implicitly aware of the antenna turn-on/turn-off time interval.

Figure 11:
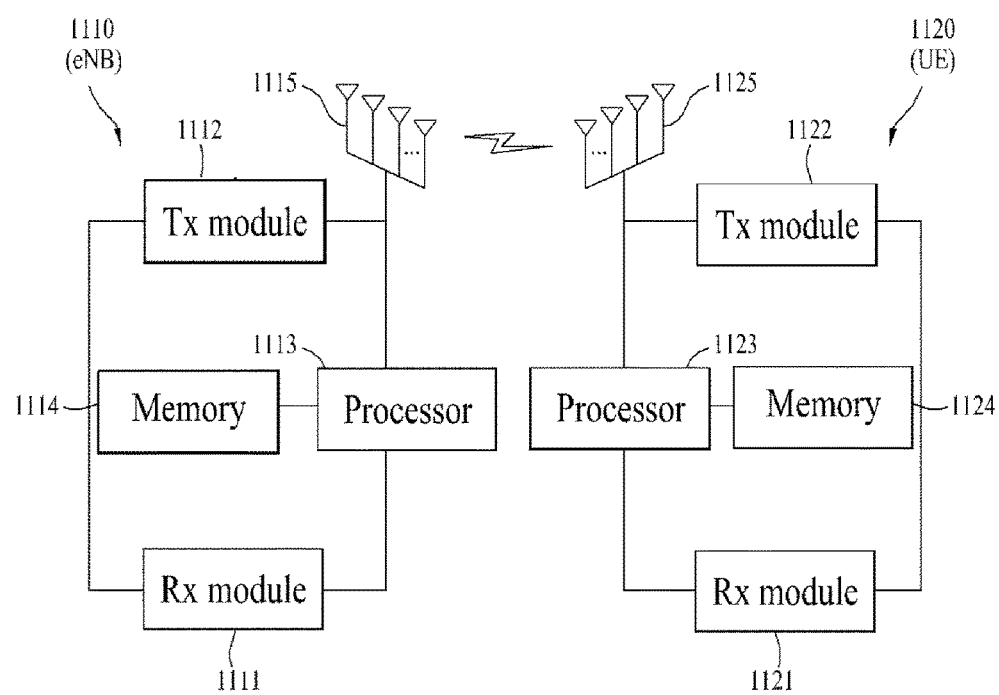
FIG. 11 is a block diagram of a transmission apparatus and a reception apparatus.

FIG. 11 is a block diagram of a transmission point and a UE according to an embodiment of the present invention.

Referring to FIG. 11, a transmission point 1110 according to the present invention may include a Reception (Rx) module 1111, a Transmission (Tx) module 1112, a processor 1113, a memory 1114, and a plurality of antennas 1115. The plurality of antennas 1115 are used to support MIMO transmission and reception. The Rx module 1111 may receive uplink signals, data and information from a UE. The Tx module 1112 may transmit downlink signals, data and information to a UE. The processor 1113 may provide overall control to the operations of the transmission point 1110.

In accordance with an embodiment of the present invention, the processor 1113 may process necessary operations including transmission of afore-described antenna turn-on/turn-off interval information.

Besides, the processor 1113 processes information received by the transmission point 1110 and information to be transmitted from the transmission point 1110. The memory 1114 may store the processed information for a predetermined time and may be replaced with a component such as a buffer (not shown).

A UE 1120 according to the present invention may include an Rx module 1121, a Tx module 1122, a processor 1123, a memory 1124, and a plurality of antennas 1125. The plurality of antennas 1125 are used to support MIMO transmission and reception. The Rx module 1121 may receive downlink signals, data and information from an eNB. The Tx module 1122 may transmit uplink signals, data and information to an eNB. The processor 1123 may provide overall control to the operations of the UE 1120.

In accordance with an embodiment of the present invention, the processor 1123 may process necessary operations including reception of the afore-described antenna turn-on/turn-off interval information.

Besides, the processor 1123 processes information received by the UE 1120 and information to be transmitted from the UE 1120. The memory 114 may store the processed information for a predetermined time and may be replaced with a component such as a buffer (not shown).

One or more of the above-described embodiments of the present invention may apply to the configurations of the transmission point and the UE, independently or in combination. Redundant descriptions are avoided for clarity.

The description of the transmission point 1110 may apply to a relay as a downlink transmission entity or an uplink reception entity, and the description of the UE 1120 may apply to the relay as a downlink reception entity or an uplink transmission entity in FIG. 11.

MODE FOR THE INVENTION

Various embodiments have been described in the best mode for carrying out the invention.

INDUSTRIAL APPLICABILITY

The embodiments of the present invention are applicable to various mobile communication systems.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive.

Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

The invention claimed is:

1. A method for receiving a signal at a User Equipment (UE) from a transmission point in a multi-tier wireless communication system, the method comprising:
   receiving, by the UE, antenna turn-on/turn-off interval information of a transmission point,
   wherein the antenna turn-on/turn-off interval information indicates at least an antenna turn-on time interval of the transmission point or an antenna turn-off time interval of the transmission point;
   wherein when the UE is in a Radio Resource Control (RRC)_CONNECTED state, the method further comprises:
      performing a cell search for one or more neighbor cells of the transmission point;
      performing a handover to one of the one or more neighbor cells;
      transmitting and receiving data to and from the one neighbor cell; and
      performing synchronization with the transmission point and transmitting and receiving data to and from the transmission point after the antenna turn-on time interval of the transmission point starts; and
   where when the UE is in an IDLE state, receiving a control signal after the antenna turn-on time interval of the transmission point starts.

2. The method according to claim 1 further comprising wherein when the UE is in the RRC_CONNECTED state, receiving a cell search command from the transmission point.

3. The method according to claim 2, wherein the cell search command includes information about the one or more neighbor cells of the transmission point.

4. The method according to claim 1, wherein when the UE is connected to the searched neighbor cell, a UE Identifier (ID) allocated to the UE by the transmission point is maintained.

5. The method according to claim 1, wherein the antenna turn-on/turn-off interval information is an indicator indicating that the UE is to receive the one or more signals from the transmission point a predetermined time later.

6. The method according to claim 1, wherein the antenna turn-on/turn-off interval information is an indicator indicating that the UE is to attempt entry into the transmission point a predetermined time later.

7. The method according to claim 1, wherein receiving the antenna turn-on/turn-off interval information of the transmission point comprises receiving the antenna turn-on/turn-off interval information on a broadcast channel.

8. The method according to claim 1, wherein receiving the antenna turn-on/turn-off interval information of the transmission point comprises receiving the antenna turn-on/turn-off interval information in system information.

9. The method according to claim 1, wherein the antenna turn-on/turn-off interval information indicates an integer multiple of a unit of time, which is one of a radio frame and a subframe.

10. The method according to claim 1, wherein the transmission point is one of a micro base station, a femto base station, a pico base station, and a relay base station.

11. A User Equipment (UE) in a multi-tier wireless communication system, comprising:
   a reception module; and
   a processor,
   wherein the processor receives, through the reception module, antenna turn-on/turn-off interval information of a transmission point,
   wherein the antenna turn-on/turn-off interval information indicates at least an antenna turn-on time interval of the transmission point or an antenna turn-off time interval of the transmission point,
   wherein when the UE is in a Radio Resource Control (RRC) CONNECTED state, the processor:
      performs a cell search for one or more neighbor cells of the transmission point;
      performs a handover to one of the one or more neighbor cells;
      transmits and receives data to and from the one neighbor cell; and
      performs synchronization with the transmission point and transmits and receives data to and from the transmission point after the antenna turn-on time interval of the transmission point starts, and
   wherein when the UE is in an IDLE state, the processor receives, through the reception module, a control signal after the antenna turn-on time interval of the transmission point starts.

12. The method according to claim 1 further comprising:
   transmitting one or more signals to the transmission point during the antenna turn-on time interval of the transmission point, according to the turn-on/turn-off interval information.

* * * * *